United States Patent
Scherer et al.

(10) Patent No.: US 7,617,186 B2
(45) Date of Patent: Nov. 10, 2009

(54) SYSTEM, METHOD AND COMPUTER PROGRAM FOR SUCCESSIVE APPROXIMATION OF QUERY RESULTS

(75) Inventors: David R. Scherer, McLean, VA (US); David A. Rosenthal, Reston, VA (US)

(73) Assignee: Omniture, Inc., Orem, UT (US)

( * ) Notice: Subject to any disclaimer, the term of this patent is extended or adjusted under 35 U.S.C. 154(b) by 306 days.

(21) Appl. No.: 10/957,671

(22) Filed: Oct. 5, 2004

(65) Prior Publication Data

US 2006/0074882 A1    Apr. 6, 2006

(51) Int. Cl.
*G06F 7/00*    (2006.01)
*G06F 17/30*   (2006.01)

(52) U.S. Cl. .................. 707/3; 707/2; 707/4; 707/104.1

(58) Field of Classification Search ............... 707/1–10, 707/100–104.1, 200–206
See application file for complete search history.

(56) References Cited

U.S. PATENT DOCUMENTS

| | | | |
|---|---|---|---|
| 5,870,752 A | | 2/1999 | Gibbons et al. |
| 5,950,189 A | * | 9/1999 | Cohen et al. .................. 707/3 |
| 6,108,647 A | * | 8/2000 | Poosala et al. ................. 707/1 |
| 6,507,840 B1 | * | 1/2003 | Ioannidis et al. ............... 707/4 |
| 2002/0035565 A1 | * | 3/2002 | Shah et al. .................. 707/100 |
| 2003/0144868 A1 | * | 7/2003 | MacIntyre et al. ............. 705/1 |
| 2004/0002956 A1 | | 1/2004 | Chaudhuri et al. |

FOREIGN PATENT DOCUMENTS

WO    02/101581 A2    12/2002

OTHER PUBLICATIONS

Hau-San Wong et al., Indexing and retrieval of 3D Models by Unsupervised Clustering with Hierarchical SOM issued, Aug. 2004, IEEE, 613-616.*
Lise Getoor et al., Selectivity estimation using probabilistic models, Jun. 2001, ACM, 461-472.*
C M Chen., Adaptive selectivity estimation using query feedback, Jun. 1994, ACM, 161-172.*
Supplementary European Search Report and Annex issued in EP 05801975.3, dated Jan. 19, 2009, 14 pages.
W. Hou, et al.: "Processing Aggregate Relational Queries with Hard Time Constraints," Sigmod Record, ACM, New York, NY, US, vol. 18, No. 2, May 31, 1989, pp. 68-77.
J. Hellerstein, et al.: "Online Aggregation," Sigmod Record, ACM, New York, NY, US, vol. 26, No. 2, Jun. 1, 2997, pp. 171-182.
D. Barbara, et al.: "The New Jersey Data Reduction Report," IEEE Data Engineering Bulletin, vol. 20, No. 4, Dec. 1997, pp. 3-42.
W. Hou, et al.: "Error-Constrained Count Query Evaluation in Relational Databases," Sigmod Record, ACM, New York, NY, US, vol. 20, No. 2, Jun. 1, 1991, pp. 278-287.

* cited by examiner

*Primary Examiner*—Jean B Fleurantin
(74) *Attorney, Agent, or Firm*—Rothwell, Figg, Ernst & Manbeck, P.C.

(57) ABSTRACT

A method, system, and computer program for generating successive approximations of the result of a query. The query is applied to successively larger samples of the data to produce successively more accurate approximations, optionally until the exact result of the query has been computed.

65 Claims, 3 Drawing Sheets

SYSTEM, METHOD AND COMPUTER PROGRAM FOR SUCCESSIVE APPROXIMATION OF QUERY RESULTS

COPYRIGHT NOTIFICATION

Portions of this patent application contain materials that are subject to copyright protection. The copyright owner has no objection to the facsimile reproduction by anyone of the patent document, or the patent disclosure, as it appears in the Patent and Trademark Office, but otherwise reserves all copyright rights.

BACKGROUND OF THE INVENTION

1. Field of the Invention

The present invention relates generally to systems and methods for analyzing and querying data. More particularly, the present invention relates to systems and methods for incrementally approximating a query result, optionally until the query result is produced exactly upon completion.

2. Description of the Related Art

Modern businesses increasingly rely on analyses of massive amounts of data. However, complex analyses and queries of large sets of data can be time consuming and expensive. Accordingly, many solutions have been devised for performing complex data analysis and queries faster and cheaper.

One way to provide a faster analysis of massive sets of data is to decrease query processing times by using more capable computer systems. Of course, computing resource capacity often comes at a steep price, which many organizations cannot afford.

One solution is to utilize certain statistical sampling techniques when processing and querying large sets of data. By creating and then querying a statistical sample of the data, a much smaller amount of data can be actually processed and then queried, thereby reducing the needed resources of the related computer system. Co-owned U.S. Published Patent Application No. 20030144868, the entire contents of which are incorporated herein by reference, describes a data processing, querying and analysis system that includes a statistical sampling function that decreases data processing and query times using statistical sampling techniques. In that system, complex processing, querying and analyses of massive amounts of data are performed. However, only a portion (i.e., a statistical sample) of a set of data larger than its dataset size limits is delivered to the portion of the computing system responsible for data query and analysis. This arrangement provides the advantage that less computing resources are required for querying and analyzing the set of data than if the entire set of data were processed and queried. Thus, that statistical sampling method saves computing resources, money and time. Of course, since the entire dataset is not made available for querying and analysis, the result provided, although accurate to sometimes acceptable levels, is not 100% accurate, unless the set of data being queried is smaller than the system's dataset size limits.

Therefore, there exists a continued need for new and improved systems and methods for processing, querying and analyzing data to save computing resources, money and time.

SUMMARY OF THE INVENTION

According to an embodiment of the present invention, a method is provided for generating a succession of approximations of the result R of a query on a plurality of data elements D. The method includes the steps of (a) computing the result $A_i$ of the query on a sample $S_i$ of D; (b) computing an approximation $B_i$ of the result R based upon at least the result $A_i$; and (c) generating a succession of approximations by performing steps (a) and (b) multiple times i with different $S_i$.

According to another embodiment of the present invention, a system is provided for generating a succession of approximations of the result R of a query on a plurality of data elements D stored in a data storage device. The system includes a processor unit configured to access the data storage device and to (a) compute the result $A_i$ of the query on a sample $S_i$ of the plurality of data elements D; (b) compute an approximation $B_i$ of the result R based upon at least the result $A_i$; and (c) generate a succession of approximations by performing (a) and (b) multiple times i with different samples $S_i$.

According to another embodiment of the present invention, a computer program is provided for generating a succession of approximations of the result R of a query on a plurality of data elements D stored in a data storage device. The computer program is stored on a computer readable medium includes a first code segment for accessing the data storage device and computing the result $A_i$ of the query on a sample $S_i$ of the plurality of data elements D. The computer program further includes a second code segment for computing an approximation $B_i$ of the result R based upon at least the result $A_i$. The computer program also includes a third code segment for generating a succession of approximations by executing the first and second code segments multiple times i with different samples $S_i$.

According to another embodiment of the present invention, a method for is provided for generating a succession of approximations of the result R of a query on a plurality of data elements D. The method includes (a) steps for computing the result A of the query on a sample $S_i$ of D; (b) steps for computing an approximation $B_i$ of the result R based upon at least the result $A_i$; and (c) steps for generating a succession of approximations by performing steps (a) and (b) multiple times i with different $S_i$.

According to another embodiment of the present invention, a system is provided for generating a succession of approximations of the result R of a query on a plurality of data elements D stored in a data storage device. The system includes a processor means for accessing the data storage device and (a) computing the result $A_i$ of the query on a sample $S_i$ of the plurality of data elements D; (b) computing an approximation $B_i$ of the result R based upon at least the result $A_i$; and (c) generating a succession of approximations by performing (a) and (b) multiple times i with different samples $S_i$.

According to another embodiment of the present invention, a system is provided for generating a succession of approximations of the result R of a query on a plurality of data elements D stored in a data storage device. The system includes a client user interface that is coupled with a data network and configured to build a query request and transmit the query request to a processing means via the data network. In response thereto, the client user interface receives and displays the successive approximation. Based on the query request, the processing means (a) computes the result $A_i$ of the query on a sample $S_i$ of the plurality of data elements D; (b) computes an approximation $B_i$ of the result R based upon at least the result $A_i$; (c) generates a succession of approximations by performing (a) and (b) multiple times i with different samples $S_i$, and (d) transmits the succession of approximations to the client user interface.

Further applications and advantages of various embodiments of the present invention are discussed below with reference to the drawing figures.

DETAILED DESCRIPTION OF THE PREFERRED EMBODIMENTS

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

Successive Approximation of Query Results (SAQR) is a novel method for producing successive approximations of a query result until the query is finished.

A "query" can be expressed as a mathematical function Q from a list of data elements (data list), where each data element is a member of "domain" D, to a result that is a member of "range" R:

$$Q: \text{list}(D) \rightarrow R$$

We refer to the application of a query function Q to a data list X as a "query on X", and to the value Q(X) produced by such an application as the "result of the query Q on X."

A query function is considered to be a "bag function" if permuting the data list does not alter the query result. For all data:

$$Q(\text{permute}(\text{data})) = Q(\text{data}).$$

A query function can be "incrementally evaluated" if there is an "update function" U from a previous result (i.e., a member of R), and a data element (also a member of D), to a new result (also a member of R), such that when U is applied to the result of a query Q on a list of data elements and to a new data element, its result is equal to the result of the query Q on the list formed by appending the new data element to the list. This can be represented by the following:

$$U: (R \times D) \rightarrow R;$$

$$U(Q(a), b) = Q(\text{append}(a, b));$$

(append(a,b) is the list [a1, a2, . . . , an, b]).

A query function can be approximated from a sample if there is an "approximation function" A, from a result (i.e., a member of R), a sample size (which is a member of the set of natural numbers N), and a population size (also a member of N), to a new result (also a member of R), such that given a sufficiently large random or pseudo-random sample of the data, the result of A applied to query Q applied to the sample, the number of data elements in the sample, and the number of data elements in the data, is a useful approximation of the result of Q applied to the data. This is represented by the following:

$$A: (R \times N \times N) \rightarrow R;$$

$(s=\text{sample}(a)) \rightarrow A(Q(s), |s|, |a|)$ is a useful approximation of Q(a).

Typically an approximation function produces an approximation of higher expected accuracy (i.e. lower expected error with respect to Q(a)) when given the result of a query on a larger sample, and produces exactly the result of the query on the population when given the entire population (i.e. A(Q(a), |a|,|a|)=Q(a)).

A query function which is a bag function and which can be approximated from a sample can be successively approximated by the method of the present invention. The preferred embodiment described next additionally requires that the query function can be incrementally evaluated.

Figure 1:
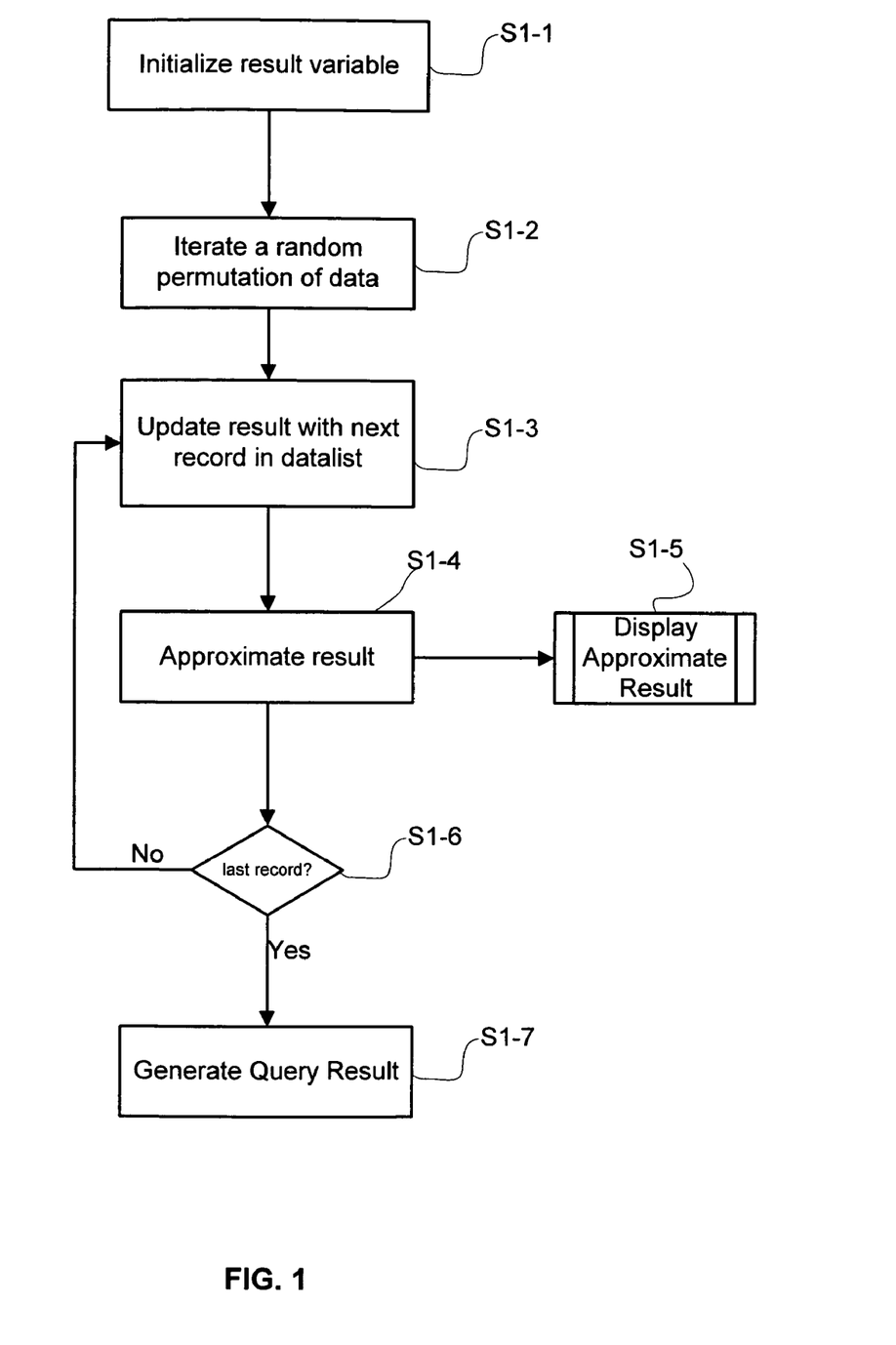
FIG. 1 is a flow chart of an exemplary SAQR method.

Referring to FIG. 1, a flow chart is shown of a method of querying data using SAQR according to an embodiment of the present invention. At step S1-1, a result variable (of domain R) is initialized to the result of the query on an empty list. This can be represented as:

$$r := Q([\,])$$

Next, at step S1-2, the query iterates (i.e., is iteratively evaluated) through a random permutation of the data, keeping track of the number of data elements to which the update function has been applied. This is represented by:

rpdata:=random_permutation(data);

for count:=1 to |rpdata|;

d:=rpdata[count].

At step S1-3, for each data element, the update function is applied to the previous result and the data element to yield a new query result, r:=U(r, d). Between applications of the update function, an approximation function can be applied to the result, the count, and the total number of data elements to yield an approximation of Q(data) at step S1-4. It should be noted that for processing efficiency, it may be necessary to perform the approximation function only periodically and not on every iteration as shown in FIG. 1. The approximation function is represented by:

$$a := A(r, \text{count}, |rpdata|).$$

Depending on the application, the approximation can be displayed at step S1-5 to a user or output to another process while the computation is in progress.

If further iterations are required (S1-6), then the next iteration of the query is evaluated. When all iterations are complete, the query result r is generated at step S1-7. Since at this point, the query has been exercised for all data, the result r is exactly equal to Q(data). At this point, the query result r can be displayed to a user, stored or output to another process.

In effect, the method of the present invention evaluates a query and generates an approximate query result on successively larger samples, thereby outputting successively better approximations until the query has considered the entire population of data. In the preceding embodiment, each sample comprises the previous sample and one additional data element, so that to proceed to the next larger sample, the update function need only be applied once. Assuming that the approximation function is efficient and disregarding the cost of the random permutation, this process will take asymptotically no longer than evaluating the query on the entire data list using the update function.

Depending on the application, it may be appropriate to compute and store a random permutation of the data elements, and then use it for many queries, or it may be more appropriate to traverse a random-access data structure in an order corresponding to a random permutation, or to use any other method for traversing the data in a corresponding order.

A data list can be maintained in a random permutation when new data elements are inserted by inserting each element at a random location in the permutation.

If data elements must be inserted, modified, or removed while a query on it is in progress, either the query should disregard such changes when it encounters them (by preserving modified or removed elements as required), or the query should take into account such changes when they fall into its current sample (i.e. into the portion of the random permutation of the data list which has already been processed by the update function). Insertion of a new element "n" into the current sample can be taken into account by simply applying the update function to them. It may also be necessary to keep track of the change in the effective sample size. This can be represented as follows:

$r:=U(r,n)$ count:=count+1

If there is an "inverse update function" $U^{-1}$ for the query such that $U^{-1}(Q(\text{append}(a,b)), b)=Q(a)$, modification of a data element from an old value "o" to a new value "n" in the current sample, or removal of a data element with old value "o" from the current sample, can be taken into account as follows:

Modification: $r:=U(U^{-1}(r,o),n)$

Removal: $r:=U^{-1}(r,o)$ count:=count−1

A truly "random" permutation may be difficult to achieve in all cases. For nearly all queries and approximation functions, sorting by a deterministic pseudo-random value, or a hash of some function of a data element which yields a different value for each data element, may be used to generate the permutation without affecting the quality of the approximation.

According to another embodiment, the data elements could be divided into two or more samples, which may be concatenated. Each data elements should fall into one sample, and each data element falls into a given sample with equal and independent probability. The concatenation of these samples, which are not necessarily in a random order internally, is not a random permutation. However, if approximations are taken only at the boundary between samples, the results will still be valid and accurate.

A very simple embodiment of the invention is to generate a small sample of the data elements, quickly evaluate the query over the small sample to generate a first approximation, and evaluate the query over the entire data list to generate a second approximation which is the exact result.

With the present invention, it is possible to terminate the query at any point in time without producing an exact query result. The approximation result could be output based upon the final iteration before termination. The query might be terminated early because, in a particular application, it can be determined based on statistical properties from the approximation function that the approximate result output is sufficiently accurate for its purposes. It might also be done because the result of the query is no longer useful due to changing circumstances.

It should be understood that the present invention can be combined with ordinary random sampling, so that only a random sample of the data elements are permuted and queried, in order to further reduce costs by sacrificing the perfect accuracy of the result when a query is complete. The same purpose can be accomplished by simply discarding a suffix of the permutation, reducing the number of data elements to be stored but making it impossible to complete a query.

An exemplary class of functions meeting the requirements of the present invention are listed below:

A sum of a function F of each data element:

$$Q(\text{data}) = \sum_{d \text{ in data}} F(d);$$

$U(r,d)=r+F(d);$ $A(r,n,N)=r*N/n.$

A combination of multiple queries:

$Q(\text{data})=(R(\text{data}),S(\text{data}));$ $U((r,s),d)=(U_R(r,d),U_S(s,d))$ $A((r,s),n,N)=(A_R(r,n,N),A_S(s,n,N))$ A function of multiple queries:

The result domain is augmented with the results of the individual queries, even though these might not be needed in the output, so that they can be used by the individual queries' update functions. An implementation might not choose to evaluate F in the update function at all.

$Q(\text{data})=(F(R(\text{data}),S(\text{data})),R(\text{data}),S(\text{data}));$ $U((f,r,s),d)=(F(U_R(r,d),U_S(s,d)),U_R(r,d),U_S(s,d))$ $A((f,r,s),n,N)=(F(A_R(r,n,N),A_S(s,n,N)),A_R(r,n,N),A_S(s,n,N))$ A selection of the data elements satisfying some predicate F, where a random sample of such a selection is a useful approximation of the entire list:

$Q(\text{data})=\text{Concatenate}\|d$ in data $(\{\{d\}$ if $F(d), \{ \}$ otherwise);

$U(r,d)=\{\text{append}(r,d)$ if $F(d),$ r otherwise;

$A(r,n,N)=r.$

The following Pseudo-code illustrates how to script an exemplary SAQR process:

```
r:=(Undefined, 0, 0)
rpdata:=random_permutation(data)
for count:=1 to |rpdata|
    d:=rpdata[count]
    r:=U(r, d)
    if (count % 3000)=0
        (fraction, numerator, denominator):=A(r, count, |rpdata|)
        print "The percentage is approximately", fraction*100.0
    if (user interrupts process)
        exit
fraction, numerator, denominator:=r
print "The percentage is exactly", fraction*100.0
exit
```

The following non-limiting example illustrates the method of the present invention. Consider analyzing information about a large number of people (for example, from a census or survey). A number of attributes might be available about each person such as "age", "2003 income", "city", and "eye color." This data could be searched repeatedly on demand to find the percentage of people meeting given criteria, for example:

What percentage of people with income<$20,000 have city="New York"?

What percentage of people with city="Seattle" have income>$80,000?

What percentage of people with age>55 have income<$15,000?

Also consider that data set is very large (e.g., the entire population of the planet Earth), and with available computing resources, will take substantial time to answer any given question such as the above. If time is of the essence for the user of the data, he or she is often willing to accept an approximate result (about 54.2%) in a short time, rather than an exact result (54.125936 . . . %) after a lengthy processing time.

Given the above, let the information about each person be represented as a tuple of attributes, and these tuples are placed in a "data" list as follows:

D=NAME×AGE×INCOME×CITY×EYECOLOR;

$d_1$=("John Doe", 25, $35300, "New York", blue);
$d_2$=("Jane Smith", 42, $61200, "Seattle", brown);
data=[$d_1, d_2, \ldots, d_n$] where ($d_i$ is a member of D).

In a pre-processing step, this data list is randomly permuted (rpdata=random_permutation(data)) to ensure that there is no systematic ordering of people. This can be accomplished, for example, by augmenting each $d_i$ with a pseudo-random key and then merge-sorting the data list by this key. These steps can be accomplished in external (disk) storage, without requiring RAM sufficient to hold the entire list of tuples.

When a query such as those described above is made, two predicate functions are defined based on the criteria in the query. For example, with the query "What percentage of people with income<$20,000 have city="New York"?", the two predicates are:

PredA(d)={1 if income(d)<$20000, 0 otherwise;
PredB(d)={1 if city(d)="New York", 0 otherwise.

For "What percentage of people with age>55 have income<$15,000?," the two predicates are:

PredA(d)={1 if age(d)>55, 0 otherwise;
PredB(d)={1 if income(d)<$15000, 0 otherwise.

Based on these predicate functions, the query function can be defined as follows:

$$Q(d) = \left(\left(\sum_{d \text{ in data}} PredA(d) * PredB(d)\right) \Big/ (Sum_{d \text{ in data}} PredA(d)),\right.$$
$$\left.\left(\sum_{d \text{ in data}} PredA(d) * PredB(d)\right), \left(\sum_{d \text{ in data}} PredA(d)\right)\right].$$

Appropriate update and approximation functions are defined as follows:

$U((f,r,s),d) = ((d+PredA(d)*PredB(d))/(d+PredA(d))$, $d+PredA(d)*PredB(d)$, $d+PredA(d))$, $A((f,r,s),n,N) = (r/s, r*N/n, s*N/n)$.

The data list is iterated and processed as already described above. In this example, each time a few thousand records have been processed, the approximation function is calculated and the result is formatted as a percentage and displayed (as an approximate result) to the user. The user can be given the opportunity to interrupt the process. If the process is not interrupted, an exact result is displayed when it completes.

The following computer listing of a script written in the PYTHON scripting language could be used to implement the above example. The computer listing is merely illustrative and exemplary, and is not intended to limit the present invention in any way.

```
import random
domains = ("name", "age", "income", "city", "eyecolor")
data =      [ ("John Doe", 25, 35300, "New York", "blue"),
              ("Jane Smith", 42, 61200, "Seattle", "brown"),
              ("Jason Johnson", 33, 48400, "Seattle", "brown"),
              ("Fred Flintstone", 10000, 0, "Bedrock", "brown"),
              ("Bob Jones", 18, 0, "Boston", "blue"),
            ]
# Duplicate the handful of records above to a remotely
# respectable size
data = data * 10000
def ToDictionary( tuple ):
        """Returns a dictionary with keys from domains and
        values from tuple"""
        dict = { }
        for k,v in zip(domains,tuple):
                dict[k]=v
        return dict
# Make a random permutation of the data
rpdata = data[:]
random.shuffle(rpdata)
while 1:
        # Ask the user to enter a query
        queryA = raw_input("Query: What percentage of people with ")
        queryB = raw_input("                    ... have ")
        # Define PredA and PredB based on the query
        def PredA(d): return float( eval(queryA, ToDictionary(d)) )
        ef PredB(d): return float( eval(queryB, ToDictionary(d)) )
        def Update( (f,r,s), d ):
                return ( r+PredA(d) and (r+PredA(d)*PredB(d))/(s+PredA(d)),
                        r+PredA(d)*PredB(d),
                        s+PredA(d) )
        def Approximate( (f,r,s), n, N ):
                return (s and r/s, r*N/n, s*N/n)
```

-continued

```
        try:
                # Progressively refine the query
                result = ("Undefined", 0, 0)
                for i,d in enumerate(rpdata):
                        count = i+1
                        result = Update(result, d)
                        if count % 1000 == 0:
                                fraction, numerator, denominator = Approximate(result, count, len(rpdata))
                                print "The percentage is approximately", fraction * 100.0
                fraction, numerator, denominator = result
                print "The percentage is exactly", fraction * 100.0
        except KeyboardInterrupt:
                print
                print "The query was interrupted by the user."
        Print
```

The preceding script was executed to produce the following exemplary results:

Query: What percentage of people with city == "New York"
        ... have income < 30000
The percentage is approximately 0.0
The percentage is approximately 0.0
The percentage is approximately 0.0
The percentage is approximately 0.0
The percentage is approximately 0.0
The percentage is approximately 0.0
The percentage is approximately 0.0
The percentage is approximately 0.0
The percentage is approximately 0.0
The percentage is approximately 0.0
The percentage is approximately 0.0
The percentage is approximately 0.0
The percentage is approximately 0.0
The percentage is approximately 0.0
The percentage is approximately 0.0
The percentage is approximately 0.0
The percentage is approximately 0.0
The percentage is approximately 0.0
The percentage is approximately 0.0
The percentage is approximately 0.0
The percentage is approximately 0.0
The percentage is approximately 0.0
The percentage is approximately 0.0
The percentage is approximately 0.0
The percentage is approximately
The query was interrupted by the user.
Query: What percentage of people with age > 20
        ... have income < 30000
The percentage is approximately 25.0316055626
The percentage is approximately 24.7648902821
The percentage is approximately 23.9038785835
The percentage is approximately 23.8170347003
The percentage is approximately 24.2576748868
The percentage is approximately 24.1379310345
The percentage is approximately 24.6695248303
The percentage is approximately 24.5721463338
The percentage is approximately 24.8015596714
The percentage is approximately 24.9749373434
The percentage is approximately 25.0
The percentage is approximately 25.0260145682
The percentage is approximately 25.0287797391
The percentage is approximately 24.9288002848
The percentage is approximately 24.8626602297
The percentage is approximately 24.9219968799
The percentage is approximately 25.0459052516
The percentage is approximately 25.0797614093
The percentage is approximately 24.9852100177
The percentage is approximately 25.0046848648
The percentage is approximately 25.1070154578
The percentage is approximately 25.0823208811
The percentage is approximately 25.145404142
The percentage is approximately 25.0886155129
The percentage is approximately 25.0275302833
The percentage is approximately 24.9843607141
The percentage is approximately 24.9212087505
The percentage is approximately 24.8747091462
The percentage is approximately 24.8616874136
The percentage is approximately 24.8402856069
The percentage is approximately 24.9201923465
The percentage is approximately 24.8816371249
The percentage is approximately 24.9687085151
The percentage is approximately 24.9687385068
The percentage is approximately 25.0223190372
The percentage is approximately 25.0355717508
The percentage is approximately 25.0388382303
The percentage is approximately 25.0419118372
The percentage is approximately 25.0272243931
The percentage is approximately 25.0421743205
The percentage is approximately 25.093004818
The percentage is approximately 25.1286781113
The percentage is approximately 25.0922938287
The percentage is approximately 25.038337025
The percentage is approximately 25.0763422353
The percentage is approximately 25.0801325583
The percentage is approximately 25.0392193358
The percentage is approximately 25.0436186558
The percentage is approximately 25.0255128074
The percentage is approximately 25.0
The percentage is exactly 25.0
Query: What percentage of people with eyecolor == "brown"
        ... have city == "Seattle"
The percentage is approximately 66.0377358491
The percentage is approximately 67.0008354219
The percentage is approximately 67.7657760091
The percentage is approximately 67.940552017
The percentage is approximately 67.5420875421
The percentage is approximately 67.6561187342
The percentage is approximately 67.0090778786
The percentage is approximately 67.1701279631
The percentage is approximately 66.8466120625
The percentage is approximately 66.5210818075
The percentage is approximately 66.3658611196
The percentage is approximately 66.3400979706
The percentage is approximately 66.3701985048
The percentage is approximately 66.5072342461
The percentage is approximately 66.5958398569
The percentage is approximately 66.5164535737
The query was interrupted by the user.

As can be clearly seen from the above example, a succession of approximations to the query result are calculated, and if the query is permitted to run to completion, the last such "approximation" is the exact query result. The expected accuracy of each successive approximation is higher, although the actual accuracy will fluctuate randomly.

The above example, due to the nature of the printed output, displays all of the successive approximations so far. This is valuable in an example, but more typically it is only necessary to display the last and best approximation.

Figure 2:
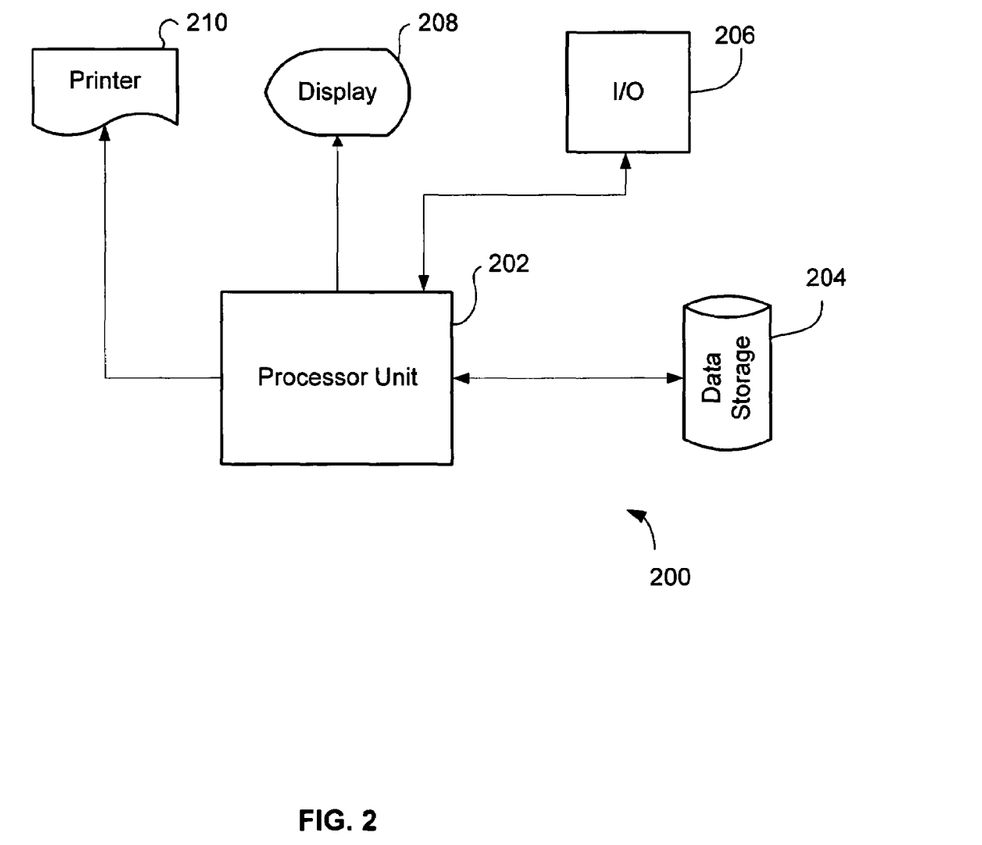
FIG. 2 is a block diagram of a computer processor arrangement which may be used to implement the present invention.

FIG. 2 is a block diagram of a processor arrangement on which the method of the present invention may be executed. Processor arrangement 200 includes a processor unit 202 coupled with a data storage device 204, an input/output (I/O) device 206, a display device 208, and a printer device 210. The processor unit may include CPU and may be configured to execute computer programs to implement the processes described above. One having ordinary skill in the art will understand that the processor arrangement 200 may be implemented with an infinite number of hardware and software configurations, and such hardware and software can be selected according to the application. For example, a SAQR engine could be written in an object oriented scripting language such as PYTHON and run on a UNIX based processor.

Data to be queried may be stored in data storage device 204, which may be a stand alone database, data warehouse, etc. Data may be organized in flat files or any other configuration. Data may be object oriented, relational, etc. One skilled in the art will understand that random permutation may be more difficult to achieve with some data constructs than with others.

One will understand that processing may be performed centrally, in a distributed fashion, or via any number of arrangements, such as a client-server or web enabled arrangement.

The data may be displayed in any fashion via any means, such as a client user interface. The information can be presented using numerous presentation techniques such as benchmarks, confidence intervals, color ramp metrics, dynamically filtered dimensions, scales and legends, trellis graphics, smooth transitions, moving average and kernel smoothing for line graphs, and others.

Figure 3:
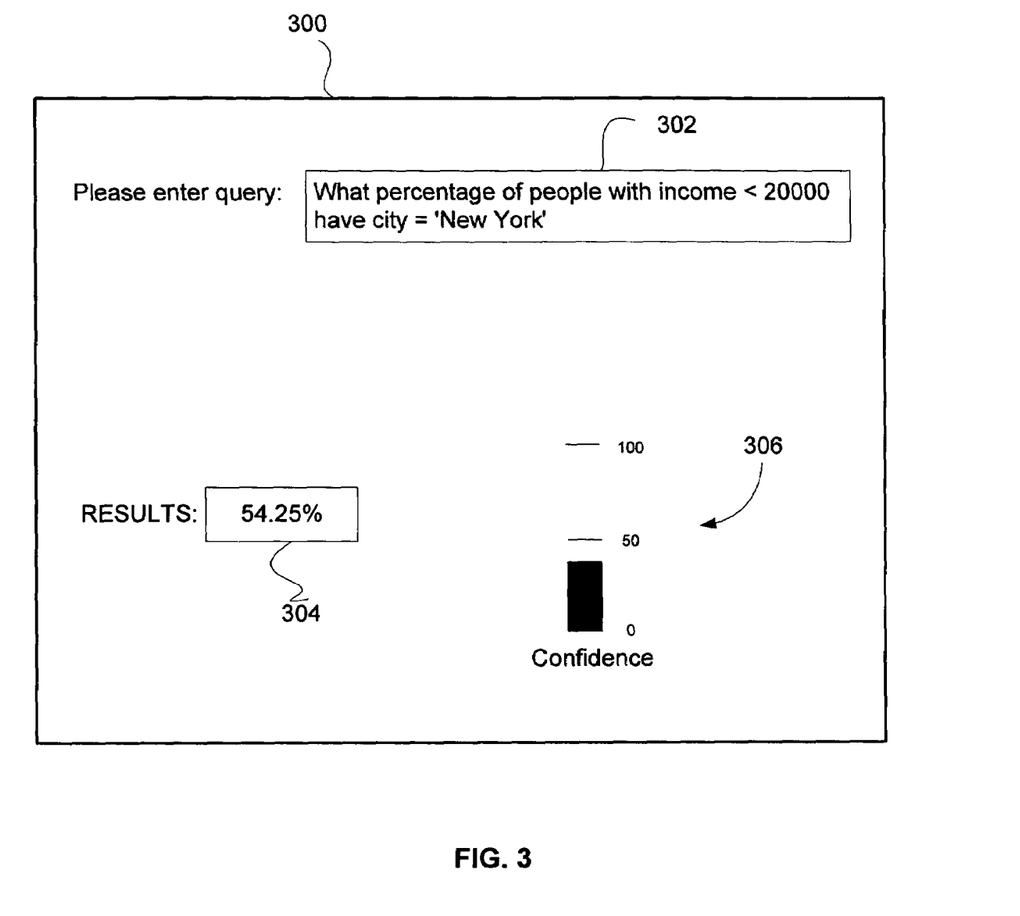
FIG. 3 illustrates an exemplary display according to an embodiment of the present invention.

FIG. 3 shows a basic, exemplary interface 300 that allows entry of a query 302 and displays results of the query 304. The results 304 may be updated as a query iterates through the data as already described above. A "confidence" indicator 306 can be displayed along with the approximate result to indicate how competent the approximation is. In this example, a simple bar graph is used to indicate how much of the data has been traversed (i.e., how large the sample is). However, a confidence indicator could be calculated using any number of statistical analysis techniques to indicate a quality of the approximation. Other characteristics of the data, such as standard deviation, could be displayed as well.

The field of statistics provides many useful formulas and methods for the calculation of confidence intervals and other metrics of accuracy. One simple and efficient formula which can be used to approximate the 80% symmetric confidence interval of a count of data elements satisfying a predicate is:

$$((count+0.68)^{\wedge}0.5*1.281551+1.2269)/count$$

One will understand that SAQR provides, inter alia, the distinct advantage that a user of the system may obtain a cascade of results that become more refined over time in response to a single user interaction with the system (i.e., based upon a single query). In other words, a dynamic query result is generated that may be displayable, in response to a single query request. The dynamic result offers a limitless set of instantaneous results, each having an increased accuracy and confidence.

Thus, a number of preferred embodiments have been fully described above with reference to the drawing figures. Although the invention has been described based upon these preferred embodiments, it would be apparent to those of skill in the art that certain modifications, variations, and alternative constructions could be made to the described embodiments within the spirit and scope of the invention.

The invention claimed is:

1. A computer-implemented method for generating a succession of approximations of a result R obtained in response to a query on a plurality of data elements D, the method comprising the steps of:
    a) utilizing at least one workstation in communication with at least one server to access data elements D stored in at least one database;
    b) utilizing the at least one server to compute a result $A_i$ of a query on a sample $S_i$ of D;
    c) computing an approximation $B_i$ of the result R based upon at least the result $A_i$; and
    d) generating a succession of approximations of the result R by performing steps (b) and (c) multiple times i with a sample $S_i$ of data elements D different from the data elements D of each prior sample, wherein, after step (b) and prior to step (c), the result $A_i$ is updated by computing $A_i$ as a function of $A_{i-1}$ and $S_i$; and
    e) displaying at least one of the succession of approximations generated in step (d) on a display device coupled to the workstation.

2. The computer-implemented method recited in claim 1, wherein in successive applications of step (b), the samples $S_i$ are successively larger (i.e., $|S_{i+1}|>|S_i|$), and in successive applications of step (c), an expected accuracy of the approximation $B_i$ is successively higher.

3. The computer-implemented method as recited in claim 1, wherein $(S_{i+1}-S_i)$ is generated by an in-order traversal of a random or pseudo-random permutation of D.

4. The computer-implemented method as recited in claim 1, wherein $(S_{i+1}-S_i)$ is generated by a random or pseudo-random traversal of D.

5. The computer-implemented method as recited in claim 1, wherein in at least one application of step (b), the sample $S_i$ comprises the plurality of data elements D.

6. The computer-implemented method as recited in claim 1, further comprising the step of building the query.

7. The computer-implemented method as recited in claim 1, wherein the at least one database is flat file.

8. The computer-implemented method as recited in claim 1, further comprising the step of:
    generating an indicator indicating a percentage that the query is complete.

9. The computer-implemented method as recited in claim 1, further comprising the step of:
    generating a confidence indicator $C_i$ for each approximation $B_i$ indicating the accuracy of said approximation $B_i$.

10. The computer-implemented method as recited in claim 1, wherein the at least one workstation and the at least one server are the same computer.

11. The computer-implemented method as recited in claim 1, wherein the at least one workstation and the at least one server are different computers.

12. The computer-implemented method as recited in claim 1, wherein the at least one workstation and the at least one server are in communication via an electronic data network.

13. A system for generating a succession of approximations of a result R obtained in response to a query on a plurality of data elements D stored in a data storage device, the system comprising:

a processor unit configured to access said data storage device and to (a) compute a result $A_i$ of a query on a sample $S_i$ of the plurality of data elements D; (b) compute an approximation $B_i$ of the result R based upon at least the result $A_i$; and (c) generate a succession of approximations of the result R by performing (a) and (b) multiple times i with a sample $S_i$ of data elements D different from the data elements D of each prior sample, wherein, after (a) and prior to (b), the result $A_i$ is updated by computing $A_i$ as a function of $A_{i-1}$ and $S_i$.

14. The system recited in claim 13, wherein said processor unit is further configured to, on successive applications of (a), select samples $S_i$ from D that are successively larger (i.e., $|S_{i+1}|>|S_i|$), and wherein in successive applications of step (b), an expected accuracy of the approximation $B_i$ is successively higher.

15. The system recited in claim 13, wherein $(S_{i+1}-S_i)$ is generated by an in-order traversal of a random or pseudo-random permutation of D.

16. The system recited in claim 13, wherein $(S_{i+1}-S_i)$ is generated by a random or pseudo-random traversal of D.

17. The system recited in claim 13, wherein in at least one application of step (a), the sample $S_i$ comprises the plurality of data elements D.

18. The system recited in claim 13, wherein said processor unit is further configured to receive a query request and to build said query based upon said query request.

19. The system recited in claim 13, wherein said processor unit is further configured to display the succession of approximations generated in (c) on a display device.

20. The system recited in claim 13, wherein said plurality of data elements D are stored in a flat file on said data storage device.

21. The system recited in claim 13, wherein said processor unit is further configured to generate an indicator indicating a percentage that the query is complete.

22. The system recited in claim 13, wherein said processor unit is further configured to generate a confidence indicator $C_i$ for each approximation $B_i$ indicating the accuracy of said approximation $B_i$.

23. The system recited in claim 22, wherein said confidence indicator $C_i$ is based upon at least the result $A_i$.

24. A computer program for generating a succession of approximations of a result R obtained in response to a query on a plurality of data elements D stored in a data storage device, the computer program stored on a computer readable storage medium and comprising:

a first code segment for accessing said data storage device and computing a result $A_i$ of the query on a sample $S_i$ of a plurality of data elements D;

a second code segment for computing an approximation $B_i$ of the result R based upon at least the result $A_i$; and a third code segment for generating a succession of approximations of the result R by executing the first and second code segments multiple times i with sample $S_i$ of data elements D different from the data elements D of each prior sample, wherein, after the first code segment and prior to the second code segment, the result $A_i$ is updated by computing $A_i$ as a function of $A_{i-1}$ and $S_i$.

25. The computer program recited in claim 24, wherein said first code segment is configured to use successively larger samples $S_i$ (i.e., $|S_{i+1}|>|S_i|$), and wherein in successive executions of the second code segment, an expected accuracy of the approximation $B_i$ is successively higher.

26. The computer program recited in claim 24, wherein $(S_{i+1}-S_i)$ is generated by an in-order traversal of a random or pseudo-random permutation of D.

27. The computer program recited in claim 24, wherein $(S_{i+1}-S_i)$ is generated by a random or pseudo-random traversal of D.

28. The computer program recited in claim 24, wherein in at least one execution of said first code segment, the sample $S_i$ comprises the plurality of data elements D.

29. The computer program recited in claim 24, further comprising a fourth code segment for building the query.

30. The computer program recited in claim 24, further comprising a fourth code segment for displaying the succession of approximations.

31. The computer program recited in claim 24, wherein said plurality of data elements D are stored in a flat file.

32. The computer program recited in claim 24, further comprising a fourth code segment for generating an indicator indicating a percentage that the query is complete.

33. The computer program recited in claim 24, further comprising a fourth code segment for generating a confidence indicator $C_i$ for each approximation $B_i$ indicating the accuracy of said approximation $B_i$.

34. A computer-implemented method for generating a succession of approximations of a result R obtained in response to a query on a plurality of data elements D, the method comprising:

a) steps for accessing, by at least one workstation in communication with at least one server, data elements D stored in at least one database;

b) steps for computing a result A of a query on a sample $S_i$ of D;

c) steps for computing an approximation $B_i$ of the result R based upon at least the result $A_i$;

d) steps for generating a succession of approximations of the result R by performing steps (b) and (c) multiple times i with a sample $S_i$ of data elements D different from the data elements D of each prior sample, wherein, after steps (b) and prior to steps (c), the result $A_i$ is updated by computing $A_i$ as a function of $A_{i-1}$ and $S_i$; and e) steps for displaying at least one of the succession of approximations generated in step (d) on a display device coupled to the workstation.

35. The computer-implemented method recited in claim 34, wherein in successive applications of (b), the samples $S_i$ are successively larger (i.e., $|S_{i+1}|>|S_i|$), and in successive applications of (c), an expected accuracy of the approximation $B_i$ is successively higher.

36. The computer-implemented method as recited in claim 34, wherein $(S_{i+1}-S_i)$ is generated by an in-order traversal of a random or pseudo-random permutation of D.

37. The computer-implemented method as recited in claim 34, wherein $(S_{i+1}-S_i)$ is generated by a random or pseudo-random traversal of D.

38. The computer-implemented method as recited in claim 34, wherein in at least one application of (b), the sample $S_i$ comprises the plurality of data elements D.

39. The computer-implemented method as recited in claim 34, further comprising steps for building the query.

40. The computer-implemented method as recited in claim 34, wherein the at least one database is a flat file.

41. The computer-implemented method as recited in claim 34, further comprising:

steps for generating an indicator indicating a percentage that the query is complete.

42. The computer-implemented method as recited in claim 34, further comprising:

steps for generating a confidence indicator $C_i$ for each approximation $B_i$ indicating the accuracy of said approximation $B_i$.

43. The computer-implemented method as recited in claim 34, wherein the at least one workstation and the at least one server are the same computer.

44. The computer-implemented method as recited in claim 34, wherein the at least one workstation and the at least one server are different computers.

45. The computer-implemented method as recited in claim 34, wherein the at least one workstation and the at least one server are in communication via an electronic data network.

46. A system for generating a succession of approximations of a result R obtained in response to a query on a plurality of data elements D stored in a data storage device, the system comprising:

a processor means for accessing said data storage device and (a) computing a result $A_i$ of a query on a sample $S_i$ of the plurality of data elements D; (b) computing an approximation $B_i$ of the result R based upon at least the result $A_i$; and (c) generating a succession of approximations of the result R by performing (a) and (b) multiple times with a sample $S_i$ of data elements D different from the data elements D of each prior sample, wherein, after (a) and prior to (b), the result $A_i$ is updated by computing $A_i$ as a function of $A_{i-1}$ and $S_i$.

47. The system recited in claim 46, wherein said processor means, on successive applications of (a), selects samples $S_i$ from D that are successively larger (i.e., $|S_{i+1}>S_i|$), and wherein in successive applications of step (b), an expected accuracy of the approximation $B_i$ is successively higher.

48. The system recited in claim 46, wherein said processing means generates $(S_{i+1}-S_i)$ by an in-order traversal of a random or pseudo-random permutation of D.

49. The system recited in claim 46, wherein said processing means generates $(S_{i+1}-S_i)$ by a random or pseudo-random traversal of D.

50. The system recited in claim 46, wherein in at least one application of (a), the sample $S_i$ comprises the plurality of data elements D.

51. The system recited in claim 46, wherein said processor means receives a query request and builds said query based upon said query request.

52. The system recited in claim 46, wherein said processor means displays the succession of approximations generated in (c) on a display device.

53. The system recited in claim 46, wherein said plurality of data elements D are stored in a flat file on said data storage device.

54. The system recited in claim 46, wherein said processor means generates an indicator indicating a percentage that the query is complete.

55. The system recited in claim 46, wherein said processor means generates a confidence indicator $C_i$ for each approximation $B_i$ indicating the accuracy of said approximation $B_i$.

56. The system recited in claim 55, wherein said confidence indicator C is based upon at least $A_i$.

57. A system for generating a succession of approximations of a result R obtained in response to a query on a plurality of data elements D stored in a data storage device, the system comprising:

a client user interface coupled with a data network and configured to build a query request and transmit said query request to a processing means via said data network, and in response thereto, to receive and display the successive approximations;

wherein based on said query request, said processing means is coupled with said data network and (a) computes a result $A_i$ of a query on a sample $S_i$ of the plurality of data elements D; (b) computes an approximation $B_i$ of the result R based upon at least the result $A_i$; (c) generates a succession of approximations of the result R by performing (a) and (b) multiple times i with a sample $S_i$ of data elements D different from the data elements D of each prior sample, wherein, after (a) and prior to (b), the result $A_i$ is updated by computing $A_i$ as a function of $A_{i-1}$ and $S_i$; and (d) transmits said succession of approximations to said client user interface.

58. The system recited in claim 57, wherein said processor means, on successive applications of (a), selects samples $S_i$ from D that are successively larger (i.e., $|S_{i+1}>S_i|$), and wherein in successive applications of step (b), an expected accuracy of the approximation $B_i$ is successively higher.

59. The system recited in claim 57, wherein said processing means generates $(S_{i+1}-S_i)$ by an in-order traversal of a random or pseudo-random permutation of D.

60. The system recited in claim 57, wherein said processing means generates $(S_{i+1}-S_i)$ by a random or pseudo-random traversal of D.

61. The system recited in claim 57, wherein in at least one application of (a), the sample $S_i$ comprises the plurality of data elements D.

62. The system recited in claim 57, wherein said plurality of data elements D are stored in a flat file on said data storage device.

63. The system recited in claim 57, wherein said processor means generates an indicator indicating a percentage that the query is complete, and said client user interface displays said indicator.

64. The system recited in claim 57, wherein said processor means generates a confidence indicator $C_i$ for each approximation $B_i$ indicating the accuracy of said approximation $B_i$, and said client user interface displays said indicator confidence indicator $C_i$.

65. The system recited in claim 63, wherein said client user interface is further configured to display said indicator graphically.

* * * * *